US010265664B2

(12) United States Patent
Bishop

(10) Patent No.: US 10,265,664 B2
(45) Date of Patent: Apr. 23, 2019

(54) SYSTEMS AND METHODS FOR GAS DISPOSAL

(71) Applicant: Hamilton Sundstrand Corporation, Charlotte, NC (US)

(72) Inventor: Benjamin E. Bishop, South Glastonbury, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 362 days.

(21) Appl. No.: 14/868,094

(22) Filed: Sep. 28, 2015

(65) Prior Publication Data

US 2017/0087521 A1    Mar. 30, 2017

(51) Int. Cl.
    *F01N 9/00*     (2006.01)
    *B01F 1/00*     (2006.01)
    (Continued)

(52) U.S. Cl.
    CPC .......... *B01F 1/0038* (2013.01); *B01F 1/0005* (2013.01); *B01F 3/04099* (2013.01); *B01F 15/0035* (2013.01); *B01F 15/00155* (2013.01); *B01F 15/00162* (2013.01); *B01F 15/00175* (2013.01); *B63G 8/08* (2013.01);
    (Continued)

(58) Field of Classification Search
    USPC ...................................................... 366/152.2
    See application file for complete search history.

(56) References Cited

U.S. PATENT DOCUMENTS

| 2,594,880 A | 4/1952 | Davis |
| 3,425,669 A | 2/1969 | Gaddis |

(Continued)

FOREIGN PATENT DOCUMENTS

| EP | 2330029 A2 | 6/2011 |
| NL | 9001805 A | 1/1991 |
| WO | 0136105 A1 | 5/2001 |

OTHER PUBLICATIONS

Extended European Search Report dated Jun. 22, 2017, issued during the prosecution of corresponding European Patent Application No. EP 17150810.4 (9 pages).

(Continued)

*Primary Examiner* — Mark Halpern
(74) *Attorney, Agent, or Firm* — Locke Lord LLP; Scott D. Wofsy; Alicia J. Carroll

(57) ABSTRACT

A method for controlling the saturation level of gas in a liquid discharge includes obtaining temperature and pressure measurements of a solvent in a mixing vessel and obtaining a pressure measurement of a source feedstock in a feedstock tank, correlating the temperature and pressure measurements of the solvent to baseline data to generate a theoretical uptake rate for the source feedstock into the solvent and a theoretical flow rate of the source feedstock into the mixing vessel, and determining a required opening setting for a feedstock valve in the feedstock input line in order to achieve a desired liquid displacement in the mixing vessel. The method includes determining an uptake duration and achieving an uptake displacement equivalent to the reverse of the desired liquid displacement. The method includes generating a valve operating control law for how the feedstock valve should function in a cycle.

5 Claims, 3 Drawing Sheets

(51) Int. Cl.

|  |  |  |
|---|---|---|
| *B01F 15/00* | (2006.01) |  |
| *B01F 3/04* | (2006.01) |  |
| *B63G 8/08* | (2006.01) |  |
| *F01N 3/04* | (2006.01) |  |
| *F01N 13/12* | (2010.01) |  |
| *G05D 21/02* | (2006.01) |  |

(52) U.S. Cl.
CPC ................ *F01N 3/04* (2013.01); *F01N 9/00* (2013.01); *F01N 13/12* (2013.01); *G05D 21/02* (2013.01); *F01N 2590/02* (2013.01)

(56) References Cited

U.S. PATENT DOCUMENTS

| 4,022,694 | A | 5/1977 | Fruman |
| 4,850,269 | A | 7/1989 | Hancock et al. |
| 6,010,677 | A | 1/2000 | Scheybeler |
| 6,123,750 | A | 9/2000 | Espinal |
| 6,406,539 | B1 | 6/2002 | Shigeto et al. |
| 6,712,215 | B2 | 3/2004 | Scheybeler |
| 6,736,687 | B2 | 5/2004 | Hauschildt |
| 7,105,039 | B2 | 9/2006 | Decker |
| 7,230,034 | B2 | 6/2007 | Mohedas et al. |
| 7,802,775 | B2 | 9/2010 | Emilsen et al. |
| 7,829,750 | B2 | 11/2010 | Beech, Jr. et al. |
| 8,109,224 | B2 | 2/2012 | Abdel-Maksoud et al. |
| 8,440,006 | B2 | 5/2013 | Laslo |
| 8,800,969 | B2 | 8/2014 | Yousfan et al. |
| 8,865,098 | B2 | 10/2014 | Suchak |
| 8,919,743 | B2 | 12/2014 | Osborn et al. |
| 8,980,085 | B1 | 3/2015 | Preiss |
| 9,050,557 | B1 | 6/2015 | Leppin et al. |
| 9,545,614 | B2 | 1/2017 | Mohr et al. |
| 9,617,509 | B2 | 4/2017 | Li et al. |
| 2005/0145498 | A1 | 7/2005 | Clark et al. |
| 2010/0145248 | A1 | 6/2010 | Myrick et al. |
| 2010/0200500 | A1 | 8/2010 | Rezania et al. |
| 2013/0005011 | A1 | 1/2013 | Bell et al. |
| 2013/0026110 | A1 | 1/2013 | Osborn |
| 2013/0039810 | A1 | 2/2013 | Riechers |
| 2014/0311416 | A1 | 10/2014 | Stiles, Jr. et al. |
| 2015/0031099 | A1 | 1/2015 | Li et al. |
| 2017/0087525 | A1* | 3/2017 | Bishop .................. B01F 5/0682 |

OTHER PUBLICATIONS

Extended European Search Report dated Jun. 9, 2017 issued during the prosecution of European Patent Application No. 16191067.4 (13 pages).

Partial European Search Report dated Feb. 20, 2017, issued during the prosecution of European Patent Application No. EP 16191067.4 (7 pages).

* cited by examiner

SYSTEMS AND METHODS FOR GAS DISPOSAL

STATEMENT REGARDING FEDERALLY SPONSORED RESEARCH OR DEVELOPMENT

This invention was made with government support under contract number NNX085-059 awarded by the United States Navy. The government has certain rights in the invention.

BACKGROUND

1. Field

The present disclosure relates to gas disposal, more specifically to dissolving gas into a liquid for underwater disposal.

2. Description of Related Art

Operation of a vehicle underwater may generate gases that need to be discharged, e.g. disposed of, as an effluent. Generally, during this discharge, efforts are made to attempt to prevent bubbles from rising to the surface where they may be detected, or for bubbles to be released into the water column or form within the effluent discharge stream where they may also be detected.

One method of doing this is dissolving the gas into liquid. The term dissolving is at times referred to also as diffusing. Many different systems and methods, depending on application, are available for dissolving gases in liquids.

Such conventional methods and systems have generally been considered satisfactory for their intended purpose. However, there is still a need in the art for improved gas discharge systems.

SUMMARY

A method for controlling the saturation level of gas in a liquid discharge includes obtaining temperature and pressure measurements of a solvent in a mixing vessel and obtaining a pressure measurement of a source feedstock in a feedstock tank. The method includes correlating the temperature and pressure measurements of the solvent to baseline data to generate a theoretical uptake rate for the source feedstock into the solvent and a theoretical flow rate of the source feedstock into the mixing vessel. The method includes determining a required opening setting for a feedstock valve in the feedstock input line as a function of a flow rate of the feedstock in order to achieve a desired liquid displacement in the mixing vessel due to the feedstock being fed into the mixing vessel. The method includes determining an uptake duration based on the expected uptake rate for the source feedstock to uptake into the solvent forming an effluent discharge solution and achieving an uptake displacement equivalent to the reverse of the desired liquid displacement. The method includes generating a valve operating control law for how the feedstock valve should function in a cycle based on the required opening setting of the feedstock valve and the uptake duration for the desired liquid displacement.

In accordance with certain embodiments, the method includes commanding the feedstock valve to meter flow rate based on the valve operating control law thereby allowing the feedstock to flow into the mixing vessel from the feedstock input line and dissolve within the solvent to generate the effluent discharge solution having a known gas solubility saturation. Determining the required opening setting for the valve as a function of the flow rate of the source feedstock through the feedstock input line can include determining the pressure within the mixing vessel, determining the pressure of the source feedstock in the feedstock input line, and determining the type of feedstock. The source feedstock can be one of a group of source feedstocks all stored in respective feedstock tanks. Each feedstock tank can be operatively connected to the feedstock input line through feedstock respective source selector valves. Determining the type of feedstock can include determining whether the feedstock is a gas only feedstock or whether the gas is a gas-liquid feedstock. The method can include determining the desired liquid displacement by determining an actual liquid level in the mixing vessel by using a mixing vessel level sensor and comparing the actual liquid level to an optimal liquid level. The method can include discharging the effluent discharge solution from the mixing vessel and determining an actual flow rate of the effluent discharge solution discharged from the mixing vessel.

In another aspect, a discharge system includes a mixing vessel and a feedstock input line defining a feedstock flow path in fluid communication with the mixing vessel. A solvent input is in fluid communication with the mixing vessel. A discharge output is in fluid communication with an outlet of the mixing vessel. A feedstock valve is on the feedstock input line to control the flow of a feedstock being fed into the mixing vessel to dissolve within a solvent thereby generating an effluent discharge solution having a known gas solubility saturation.

In accordance with certain embodiments, the discharge system includes a controller configured to be operatively connected to the feedstock valve. The controller can include a processor operatively connected to a memory, wherein the memory includes instructions recorded thereon that, when read by the processor, cause the processor to perform the method described above. It is contemplated that the discharge system can include a differential pressure sensor operatively connected between the feedstock input line and the discharge output to measure the differential pressure between the feedstock input line and the discharge output and operatively connected to the controller to provide the change in pressure data thereto.

The mixing vessel can include a nozzle proximate to a first side of the mixing vessel. The solvent input can be operatively connected to the nozzle to direct the solvent toward a gas pocket generated by the gas entering with the source feedstock through the feedstock input line. It is contemplated that the solvent input line can be split into two lines. A first of the two lines can define a flow path to the mixing vessel through the nozzle. A second of the two lines can define a flow path to the mixing vessel through an inlet on a second side of the mixing vessel.

In accordance with certain embodiments, the discharge system includes a solvent temperature sensor operatively connected to the solvent input line to provide a solvent temperature reading to a controller. It is contemplated that the discharge system can include a solvent pressure sensor operatively connected to the solvent input line to provide a solvent pressure reading to a controller. The feedstock valve can be one of two feedstock valves within the feedstock flow path. Each feedstock valve can be operatively connected to a controller to provide redundancy for feedstock flow shutoff and balance wear. The discharge system can include a mixing vessel level sensor operatively connected to the mixing vessel to provide level measurements of a liquid in the mixing vessel to a controller.

In accordance with another aspect, a method for determining the status of the discharge system includes determining whether the discharge system conditions are normal or abnormal, sending a signal indicative of abnormal function if any of the system conditions are abnormal and sending a signal indicative normal function if all of the system conditions are normal. The method includes pausing operation the discharge system off if the signal indicative of abnormal function is sent to avoid bubble discharge from the discharge output during abnormal system conditions. Discharge system conditions include a desired solvent flow, a desired feedstock flow, a pressure in the mixing vessel, operation of the feedstock valve, and/or operation of sensors.

The mixing vessel can include a level switch configured to be wired to a solenoid drive circuit for the feedstock valve. Determining whether the discharge system conditions are normal or abnormal can include determining whether there is solvent in the mixing vessel by retrieving a signal from the level switch that indicates a dry or wet position. If the level switch is in the dry position, and at least one of the solenoid drive circuit is energized, or the feedstock valve is open, the system conditions are abnormal.

Determining whether the discharge system conditions are normal or abnormal can include verifying that a desired solvent flow is occurring by measuring differential pressure (dP) across the discharge output with a dP sensor and comparing the measured dP to a reference dP threshold range, and determining that the discharge system conditions are abnormal if the dP is outside of the dP threshold range. Verifying that the desired solvent flow is occurring can include calibrating the dP threshold range to account for a dP pattern when feedstock is added to the mixing vessel. Verifying that the desired solvent flow is occurring can include verifying that the dP sensor is operating properly by determining dP as a function of vessel pressure and feedstock type.

In accordance with certain embodiments, determining whether the discharge system conditions are normal or abnormal includes determining whether the feedstock source control valve is operating. Determining whether the discharge system conditions are normal or abnormal can include monitoring mixing vessel pressure and determining the discharge conditions are abnormal if the mixing vessel pressure exceeds a pre-determined warning threshold. Determining whether the discharge system conditions are normal or abnormal can include checking the status of a mixer pressure sensor in the mixing vessel by comparing a mixer pressure reading by the mixer pressure sensor to a feedstock uptake rate.

It is contemplated that determining whether the discharge system conditions are normal or abnormal can include checking the status of the dP sensor when only the solvent is flowing by comparing the measured dP to an expected dP band, and determining the discharge conditions are abnormal if the measured dP is outside of the expected dP band. Determining whether the discharge system conditions are normal or abnormal can include checking the status of the dP sensor when only the feedstock is flowing by comparing the measured rise in dP to an expected dP rise band, and determining the discharge conditions are abnormal if the measured dP is outside of the expected dP rise band.

Determining whether the discharge system conditions are normal or abnormal can include checking the status of a mixer temperature sensor by comparing a measured mixer temperature to an expected mixer temperature band, and determining the discharge conditions are abnormal if the measured mixer temperature is outside of the expected mixer temperature band. Determining whether the discharge system conditions are normal or abnormal can include checking a status of a mixing vessel level sensor at the beginning of a discharge event by comparing a measured mixing vessel level to an expected mixing vessel level threshold, and determining the discharge conditions are abnormal if the measured mixing vessel level is lower than the expected mixing vessel level threshold. Determining whether the discharge system conditions are normal or abnormal can include checking a status of a mixing vessel level sensor by measuring a change in mixing vessel level and comparing the change in mixing vessel level with an expected mixing vessel level change, wherein the expected mixing vessel level change is a function of feedstock type and an expected feedstock uptake rate, determining the discharge conditions are abnormal if the measured mixing vessel level change is lower than the expected mixing vessel level threshold.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
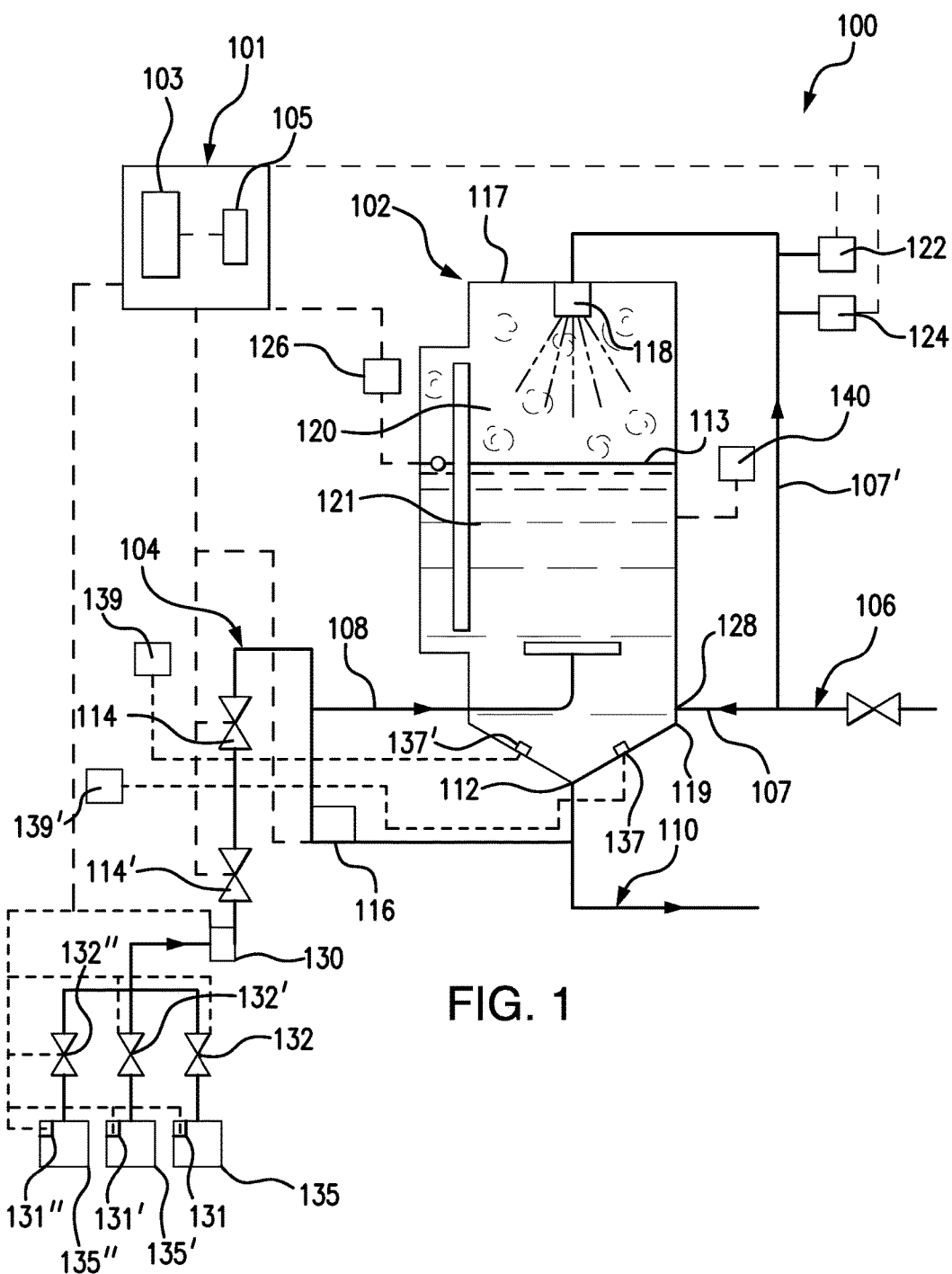
FIG. 1 is a schematic depiction of an embodiment of a discharge system constructed in accordance with the present disclosure, showing the mixing vessel having a feedstock input line and a solvent input.
Figure 2:
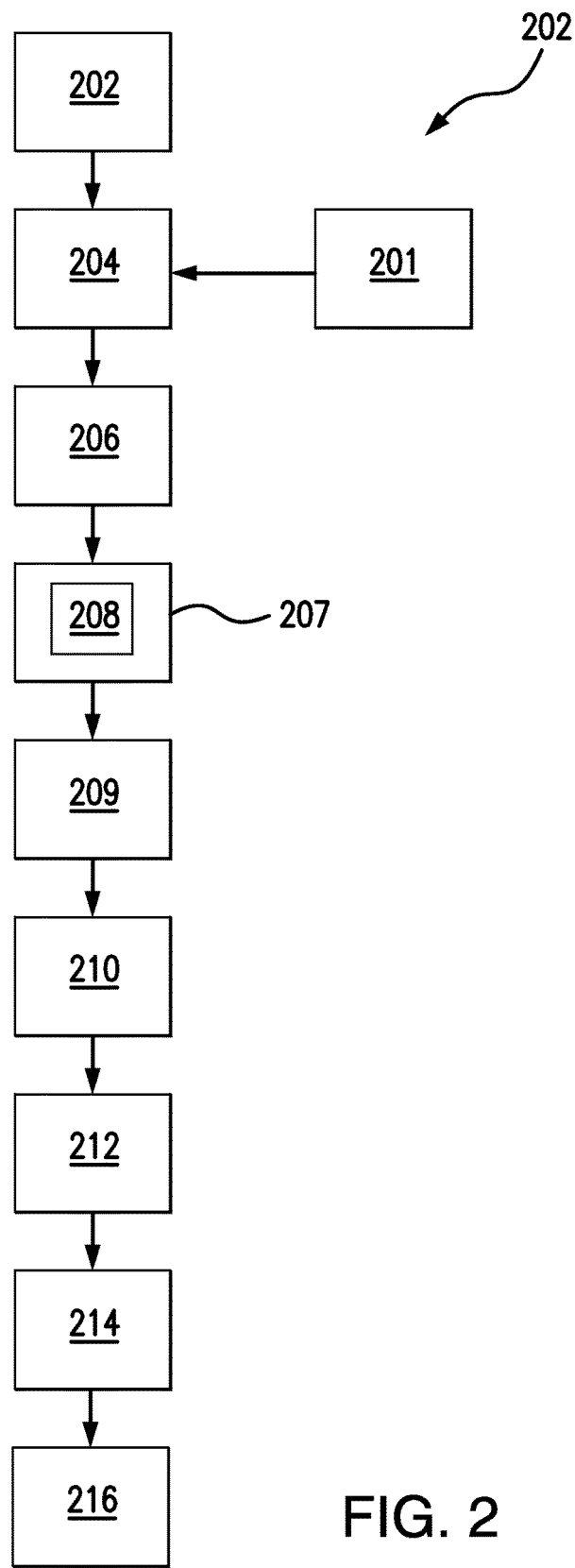
FIG. 2 is a flowchart of an exemplary method for controlling the saturation level of gas in a liquid discharge in accordance with the present disclosure.
Figure 3:
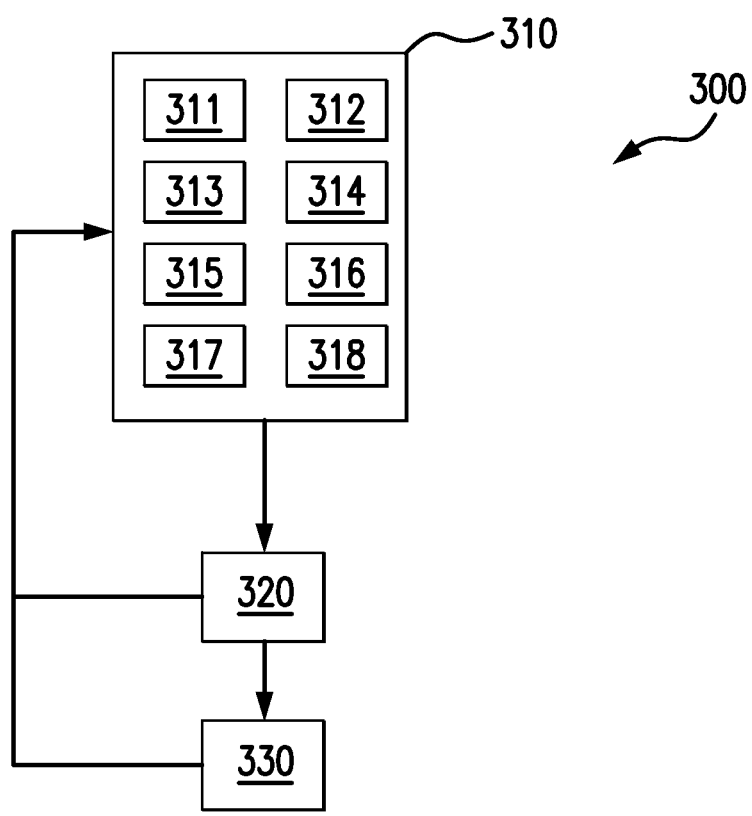
FIG. 3 is a flowchart of an exemplary method for determining the status of the discharge system in a liquid discharge in accordance with the present disclosure.

Reference will now be made to the drawings wherein like reference numerals identify similar structural features or aspects of the subject disclosure. For purposes of explanation and illustration, and not limitation, an illustrative view of an embodiment of a discharge system in accordance with the disclosure is shown in FIG. 1 and is designated generally by reference character 100. Other embodiments and/or aspects of this disclosure are shown in FIGS. 2-3. The systems and methods described herein can be used to mix one or more soluble gas or gas and liquid feedstocks with a solvent, for example, saltwater, and discharge the solution with a known gas solubility saturation level such that the saturation level of gas in the liquid is well below that of typical bubble formation when released. This minimizes potential bubble formation from turbulent conditions or thermal hotspots after release.

As shown in FIG. 1, a discharge system 100 includes a mixing vessel 102 and a feedstock input line 104 defining a feedstock flow path 108 in fluid communication with mixing vessel 102. A solvent input 106 is in fluid communication with mixing vessel 102. A discharge output 110 is in fluid communication with an outlet 112 of the mixing vessel 102. Feedstock valves 114 and 114' are on feedstock input line 104 to control the flow of a feedstock, e.g. a gas or gas-fluid mixture, being fed into mixing vessel 102 to dissolve within a solvent thereby generating an effluent discharge solution having a known gas solubility saturation. Feedstock input line 104 is operatively connected to multiple feedstock tanks 135, 135' and 135". Discharge system 100 includes a controller 101 configured to be operatively connected to each valve 114 and 114'. Valves 114 and 114' provide redundancy for feedstock flow shutoff and balance wear. For example, valve 114 can cycle in accordance with a duty cycle control law, described below, while valve 114' can be held open. This continues throughout a discharge event, e.g. when the feedstock is flowing into mixing vessel 102. At the start of the next discharge event, or in switching to another feedstock, the roles of valves 114 and 114' are switched, balancing the wear between valves 114 and 114'.

With continued reference to FIG. 1, controller 101 includes a processor 103 operatively connected to a memory 105, wherein memory 105 includes instructions recorded thereon that, when read by processor 103, cause processor 103 to perform a method described below. Discharge system 100 includes a differential pressure (dP) sensor 116 operatively connected between the feedstock input line 104 and the discharge output 110 to measure the dP between the feedstock input line 104 and the discharge output 110. Pressure sensor 116 is operatively connected to controller 101 to provide the dP data thereto. Mixing vessel 102 includes a nozzle 118 proximate to a first side 117 of mixing vessel 102. Solvent input 106 is operatively connected to nozzle 118 to direct a solvent toward a gas pocket 120 generated by the gas entering with the feedstock through the feedstock input line 104 as gas or gas-liquid feedstock during the discharge event. Solvent input 106 is split into two lines 107 and 107'. Line 107 defines a flow path to mixing vessel 102 through an inlet 128 on a second side 119 of mixing vessel 102. Line 107' defines a flow path to mixing vessel 102 through nozzle 118.

Discharge system 100 includes pressure sensors 131, 131', 131" for each feedstock tank 135, 135', 135" upstream of valve 114' to measure pressure of each feedstock at its source. There are respective feedstock source selector valves 132, 132', 132" between each of tanks 135, 135', 135" and a pressure sensor 130. Pressure sensor 130 is operatively connected in the feedstock input line 104 between feedstock source selector valves 132, 132', 132" and valve 114'. Sensor 130, each of pressure sensors 131, 131', 131", and each feedstock valve 132, 132', 132" are operatively connected to controller 101. Those skilled in the art will readily appreciate that while a plurality of feedstock tanks 135, 135', 135' are shown, it is contemplated that any number of feedstock tanks 135, 135', 135", and, in turn, any number of feedstock sources, can be used.

Discharge system 100 includes a solvent temperature sensor 122 operatively connected to solvent input line 107' to provide a temperature reading to controller 101. Discharge system 100 includes a solvent pressure sensor 124 operatively connected to solvent input line 107' to provide a solvent pressure reading to controller 101. System 100 includes a mixing vessel level sensor 126 operatively connected to mixing vessel 102 and to controller 101 to provide level measurements of the liquid in mixing vessel 102 to determine the desired liquid displacement needed in order to achieve or maintain an optimal liquid level in mixing vessel 102.

As shown in FIG. 2, a method 200 for controlling the saturation level of gas in a liquid discharge includes determining baseline data by performing lab or field tests under a fixed set of conditions, and determining theoretical solubility and flow kinetics for a variety of feedstock sources, e.g. those stored in respective feedstock tanks 135, 135', 135', as a function of the temperature and pressure of each feedstock, as shown by box 201. Baseline data and theoretical solubility and flow kinetics can be stored in memory 105. Method 200 adjusts valve cycle timing during continuous operation, and minimizes pressure spikes in the mixing vessel during initiation of the roiling turbulence to achieve maximum uptake rate. Those skilled in the art will readily appreciate that roiling turbulence is induced when a gas pocket grows large enough for the nozzle spray to be surrounded by mostly gas. The high velocity liquid exiting nozzle 118 entrains some surrounding gas, which is then carried into a liquid surface 113 of bulk liquid 121. The momentum of the liquid spray plus the entrained gas then creates the roiling surface conditions. Those skilled in the art will also readily appreciate that, for closed loop control, method 200 operates without needing immediate feedback.

Method 200 includes obtaining temperature and pressure measurements of a solvent in a mixing vessel, e.g. mixing vessel 102, and obtaining a pressure measurement of a plurality of feedstock sources in respective feedstock tanks, e.g. feedstock tanks 135, 135', 135", as indicated by box 202. Temperature and pressure measurements for the solvent are obtained by controller 101 through temperature and pressure sensors, 122 and 124. The pressure measurement for each feedstock is obtained by controller 101 through respective pressure sensors 131, 131', 131". Method 200 includes correlating the temperature and pressure measurements of the solvent and the pressure measurement of each of the feedstock sources to the baseline data stored in memory 105 to generate a theoretical uptake rate for each feedstock within the mixing vessel and theoretical flow rate of feedstock into the mixing vessel, as indicated by box 204. It is contemplated that the theoretical uptake rate and the theoretical flow rate can be adjusted by continuously correlating the solvent temperature and pressure, and the pressure measurement of each feedstock source to the baseline data, shown by box 201, to update or reconfirm the theoretical uptake rate and theoretical flow rate.

Method 200 includes determining a desired liquid, e.g. liquid 121, displacement by determining the actual liquid level in the mixing vessel using a liquid level sensor, e.g. mixing vessel level sensor 126, and comparing the actual liquid level to an optimal liquid level, as indicated by box 206. Determining the actual liquid level is achieved by using a filtered average of measurements from the mixing vessel level sensor. At the beginning of a discharge event, the gas is fed into the mixing vessel as a feedstock through a feedstock input line, e.g. feedstock input line 104, and forms a gas pocket, e.g. gas pocket 120, within the mixing vessel.

With continued reference to FIG. 2, method 200 includes determining a required opening setting for a valve, e.g. valves 114 or 114', in the feedstock input line as a function of a flow rate of the feedstock in order to achieve the desired liquid displacement in the mixing vessel due to the feedstock being fed into the mixing vessel, as indicated by box 207. The required opening setting can be in the form of a required open duration of the valve for a given cycle, e.g. if the valve is a solenoid valve, and/or the required opening setting can be in the form of a specific flow rate and/or open duration at the given flow rate, e.g. if the valve is metering valve. Determining the required opening setting for the valve as a function of the specific flow rate of a given one of the feedstock sources includes determining the pressure within the mixing vessel, determining the pressure of the given feedstock source, the pressure of the feedstock in the feedstock input line, and the type of feedstock, as indicated by box 208. Those skilled in the art will readily appreciate that the feedstock can be in the form of a gas only feedstock and/or a gas-liquid feedstock. Determining the type of feedstock, as indicated by box 208, includes determining whether the feedstock is a gas only feedstock or whether the gas is a gas-liquid feedstock, as well as the type of gases and liquids of each feedstock, and determining which theoretical and adjustment data sets currently apply. It also determines which of the feedstock source isolation valves, e.g. feedstock source selector valves 132, 132', 132", are to be used.

Those skilled in the art will readily appreciate that if more than one gas or gas-liquid feedstock source is used, each feedstock source is separately characterized. Additionally, it is contemplated that when there are multiple feedstock sources, a priority scheme is set such that the higher priority feedstock source interrupts lower priority feedstock discharge. Flow from the lower priority feedstock source is stopped and feed calculations based upon the higher priority feedstock are computed and used until that feedstock's discharge limits are met, and then controller 101 resumes discharge of the lower priority feedstock.

At the start of a discharge event, there is no gas pocket within the mixing vessel, and the addition of gas through the feedstock creates a pressure spike. Method 200 operates to lower the liquid level with short cycles of feedstock flow by opening valves 114, 114', and at least one of valves 132, 132' and 132", which add gas, until the optimal liquid level is reached. Over time, if the liquid level continues to drop, the valve "ON" duty cycle times are shortened, and if the level rises, the valve "ON" pulses or durations are increased. It is also contemplated that method 200 includes hard safety stops exist so that mixing vessel 102, always has a sufficiently low gas to liquid ratio to prevent accidental discharge of bubbles during rapid ascent. If the vehicle begins an ascent, with the elevated mixer pressure, method 200 can still include adding feedstock to the mixing vessel. To minimize the size of mixing vessel 102 and minimize the flow rate of the solvent, both of which impact the volume and power required to achieve a given level of effluent gas disposal, it is desired to continually supply feedstock during all maneuvers of the vehicle, including ascent.

Controller 101 utilizes the required opening setting to generate a valve operating control law, described below, without real time feedback of level sensor readings. This means that the actual solvent displacement for a given valve opening setting is not dependent upon the closed loop of activate/sense/deactivate steps found in a typical control system, making the system operationally insensitive to vehicle pitch and roll, and the effects of the roiling surface of the liquid within the mixing vessel, all of which might cause faulty mixing vessel liquid level measurement in traditional systems.

With continued reference to FIG. 2, method 200, as indicated by box 209, includes determining an uptake duration for the given feedstock source to uptake into the solvent to form an effluent discharge solution and achieving an uptake displacement equivalent to the reverse of the desired liquid displacement based on the baseline uptake rate. Method 200 includes generating a valve operating control law for how long the valve should be opened in a cycle, as indicated by box 210, based on the required opening setting to supply feedstock as determined in box 207, and the uptake duration for the desired liquid displacement of the feedstock being processed.

Those skilled in the art will readily appreciate that the cycle can be repeated until all the desired feedstock is discharged. Method 200 makes continuous adjustments to the valve operating control law based on pressure and temperature changes. Method 200 is a closed loop control method without immediate feedback, making the valve operating control law insensitive to noise in a discharge system, e.g. discharge system 100, such as, communications errors, intermittent loss of feedback signal, and inconsistencies due to pitch and roll. This insensitivity provides robust operation at startup, shutdown, and under transient conditions, and maintains high performance with wide pressure tolerance, and wide temperature tolerance. Those skilled in the art will readily appreciate that high performance includes near optimal gas discharge saturation level under all temperature and pressure conditions, operation during all maneuvers of the vehicle, and elimination of all risk that some bubbles may escape in the discharge fluid due to a low liquid level in the mixing vessel 102, thereby causing suctioning of gas out of the outlet of the mixing vessel, e.g. outlet 112.

Method 200 includes commanding at least one of the source selector valves, e.g. source selector valves 132, 132', 132", and the feedstock valves, e.g. feedstock valves 114 and 114', to meter flow rate based on the valve operating control law, as shown by box 212. Those skilled in the art will readily appreciate that metering flow rate includes commanding the valves to open and close for a specific duration, and/or includes metering the flow rate through the valves, depending on the type of valve used. This allows feedstock to flow into the mixing vessel 102 from the feedstock input line 104 and dissolve within the solvent to generate the effluent discharge solution having a known gas solubility saturation.

Method 200 includes determining an optimal liquid level within the mixing vessel and commanding at least one of the source selector valves and the feedstock valve to maintain the optimal liquid level to maintain the desired turbulence at the interface between the gas pocket and the solvent within the mixing vessel, as indicated by box 214. The control further utilizes measurements to maintain a level near the optimal uptake rate within the mixing vessel, which is another constant independently determined by the theoretical flow calculations of box 204 for the feedstock, the theoretical calculations of uptake of the feedstock determined in box 207, and the normalization of the two calculations to obtain the control law for valves 114 and 114', determined in box 212. Method 200 includes discharging the effluent discharge solution from the mixing vessel and determining the actual flow of the effluent discharge solution discharged from the mixing vessel, as indicated by box 216. Method 200 also includes dynamically adjusting the theoretical computations 214 and 216 from data received regarding the filtered average of measurements from the mixing vessel level sensor.

Those skilled in the art will readily appreciate that liquid feedstock, e.g. the gas-fluid mixture, has the potential of leaving liquid slugs in the feedstock input line. Cycling of valves 114 and 114' according to the generated operating control law can create water hammer when shut at the end of a flow cycle. To prevent this, in certain embodiments method 200 includes short cycling the valve for several duty cycles whenever switching from a liquid to a gas-only feedstock, or upon initiation of feeding a gas-only feedstock after a long idle time. This includes using measurements from steps indicated by box 202, the prior operational history of type of feedstock is analyzed in the step indicated by box 210, including idle time, and if the potential exists for liquid to be sitting in the line volume between valves 114' and each of valves 132, 132', 132", then at the start of switching from one feedstock source to another, or upon initial startup (liquid may have "wept" through the valves over long periods of time), the timing control laws for valves 114, 114', 132, 132', 132", are sequenced with much shorter cycles to gently "push" any liquid along and into the mixing vessel. If the nominal timing were performed, feedstock might be accelerated along the line between one or more of feedstock source isolation valves 132, 132', 132", and the control valves 114 and 114'. Then, since liquid flow carries much more momentum, and also moves more slowly, either valve 114 or 114' might cycle shut as the liquid begins to pass through the valve, creating acoustically noisy and potentially damaging "water hammer" pressure spike. By initially "flushing" the liquid, water hammer effects are prevented. Further, it is assumed that any gas-liquid mixed feedstock is supplied at 100% saturation at an elevated pressure because: a) the gas and liquid were either co-formed, or stored long enough in a static vessel, such that enough time had lapsed that the solubility reached equilibrium, and b) the upstream pressure needs to be higher just to create flow.

It is contemplated that discharge system 100 and method 200 are capable of reducing the gas pocket level in mixing vessel 102 by 0.5 inch every 3 to 10 seconds, at the worst case temperature and pressure. At colder and deeper conditions, this rate may increase, but the design is relatively insensitive to pressure changes up to relatively high pressure. At very high pressures in mixing vessel 102, feed rates from a feedstock input line 104 are relatively low since the delta pressure is much lower and typically less than a 2:1 ratio, so sonic flow does not exist. Further, at high pressure, the kinetic uptake rate and bulk solubility of a feedstock gas in the solvent is such that adding feedstock may not change the level within the mixing vessel.

Mixing vessel 102, solvent flow rate, and required discharge pressure drop are all sized for the worst case shallow/warmest solvent temperature. Typical systems may have a dynamic range of more than 20:1 as compared with the deep or high pressure, cold solvent case. Those skilled in the art will readily appreciate that method 200 includes monitoring discharge pressure drop with a pressure sensor, e.g. differential pressure sensor 116, operatively connected between the feedstock input line and a discharge output, e.g. discharge output 110, as an added diagnostic capability with potential control system value in preventing gas bubble discharge to off nominal conditions. With the mixing vessel, solvent flow, and piping all sized for the worst case conditions of warm solvent and low mixing pressure, the calculations all result in higher feedstock disposal rates than the worst case conditions.

Now with reference to FIG. 3, in accordance with another embodiment of the disclosure a method 300 for determining the status of a discharge system, e.g. discharge system 100, is shown. Method 300 includes specific tests to assure that the two main solenoid valves, e.g. 114 and 114', of system 100 shut and open properly, that source feedstock flows when open, and that feedstock does not flow when closed. Method 300 also detects low or zero solute flow, detects operator error in valve alignment for overboard discharge, and detects other failures which prevent proper discharge of bubble less effluent. Method 300 includes determining whether the discharge system conditions are normal or abnormal, as indicated by box 310. Discharge system conditions include a desired solvent flow, a desired feedstock flow, a pressure in the mixing vessel, operation of the feedstock valve, and/or operation of sensors.

With continued reference to FIG. 3, method 300 includes sending a signal indicative of abnormal function if any of the system conditions are abnormal and sending a signal indicative normal function if all of the system conditions are normal, as indicated by box 320. Method 300 includes pausing operation the discharge system off if the signal indicative of abnormal function is sent to avoid bubble discharge from the discharge output during abnormal system conditions, as indicated by box 330.

As shown in FIG. 1, mixing vessel 102 includes two independent level switches 137 and 137'. Each level switch 137 and 137' is wired to a respective solenoid drive circuit 139 and 139' for respective feedstock valve 114 and 114'. With continued reference to FIG. 3, determining whether the discharge system conditions are normal or abnormal includes determining whether there is solvent in the mixing vessel by retrieving a signal from the level switch that indicates a dry or wet position, as indicated by box 311. If the level switch is in the dry position, and at least one of the solenoid drive circuit is energized, or the feedstock valve is open, the system conditions are abnormal.

With continued reference to FIG. 3, determining whether the discharge system conditions are normal or abnormal includes verifying that a desired solvent flow is occurring by measuring differential pressure (dP) across the discharge output with a dP sensor and comparing the measured dP to a reference dP threshold range, and determining that the discharge system conditions are abnormal if the dP is outside of the dP threshold range, as indicated by box 312. Verifying that the desired solvent flow is occurring includes calibrating the dP threshold range to account for a dP pattern when feedstock is added to the mixing vessel. For example, when feedstock is added to the mixer, the dP generally should spike, level off, and abate when the feed is stopped. Verifying that the desired solvent flow is occurring includes verifying that the dP sensor is operating properly by determining dP as a function of vessel pressure and feedstock type. For example, during operation, the solvent level in mixing vessel is a function of the feedstock and various operating pressures. Proper operation of the sensor is also verified as a function of pressure and feedstock type. Additionally, during operation, uptake of feedstock, as measured by a rise in level, verifies solute flow. Failures of any of these tests results in appropriate operator signals, and pause or full shutdown of the system.

With reference now to FIGS. 1 and 3, determining whether the discharge system conditions are normal or abnormal includes determining whether the feedstock source control valve is operating, as indicated by box 313. At the start of discharge of any particular feedstock, e.g. feedstock from feedstock tanks 135, 135', 135", each feedstock source selector valve 132, 132', and 132" is opened singly, and both dP and mixing vessel pressure is measured to detect any feedstock flow. This verifies that none of valves 132, 132' and 132" leak. Then, with one valve open, the other is short cycled and pressures are again measured, to assure that flow occurs, and then stops when the short cycle ends. This is repeated for the alternate combination of the two feedstock valves, verifying that each valve opens when commanded, and each shuts. The process is repeated at the end of a discharge condition. Further, during normal duty cycle operation, the dP and mixing vessel pressure are verified to change when feed is occurring, and that dP and mixing vessel pressure remain stable when feed is not occurring. Finally, depending upon mixing vessel pressure and the type of feedstock, establishment of a gas pocket and variation of mixing vessel level consistent with valve cycle times is further verified to assure both valve operation and to detect potential sensor failure.

As shown in FIGS. 1 and 3, determining whether the discharge system conditions are normal or abnormal includes monitoring mixing vessel pressure with a mixing vessel pressure sensor 140 and determining the discharge conditions are abnormal if the mixing vessel pressure exceeds a pre-determined warning threshold. It is also contemplated that, even in a 'pause' scenario, if the mixing vessel pressure exceeds a shutdown threshold, the system is automatically shut down. Moreover, feedstock pressures for some source feedstocks may exceed the vehicle or structures fluid pumping and discharge design levels. Those skilled in the art will readily appreciate that specific warning and shutdown set points can also be established for feedstock pressures.

With continued reference to FIGS. 1 and 3, determining whether the discharge system conditions are normal or abnormal includes comparing the mixing vessel pressure reading taken by mixing vessel pressure sensor 140 to a gas uptake rate, as indicated by box 314. Determining whether the discharge system conditions are normal or abnormal includes checking the status of the dP sensor when only the solvent is flowing by comparing the measured dP to an expected dP band, and determining the discharge conditions are abnormal if the measured dP is outside of the expected dP band, as indicated by box 315. Determining whether the discharge system conditions are normal or abnormal includes checking the status of the dP sensor when only the feedstock is flowing by comparing the measured rise in dP to an expected dP rise band, and determining the discharge conditions are abnormal if the measured dP is outside of the expected dP rise band, as indicated in box 316.

Determining whether the discharge system conditions are normal or abnormal includes checking the status of a mixer temperature sensor by comparing a measured mixer temperature to an expected mixer temperature band, and determining the discharge conditions are abnormal if the measured mixer temperature is outside of the expected mixer temperature band, as indicated by box 317.

With continued reference to FIG. 3, determining whether the discharge system conditions are normal or abnormal includes checking a status of a mixing vessel level sensor, as indicated by box 318. At the beginning of a discharge event, checking the status of the mixing vessel level sensor includes comparing a measured mixing vessel level to an expected mixing vessel level threshold. If the measured mixing vessel level is lower than the expected mixing vessel level threshold, the discharge conditions are abnormal. After the start of the discharge event, checking the status of the mixing vessel level sensor includes measuring a change in mixing vessel level and comparing the change in mixing vessel level with an expected mixing vessel level change. If the measured mixing vessel level change is lower than the expected mixing vessel level threshold, the discharge conditions are abnormal. The expected mixing vessel level change is a function of feedstock type and an expected gas uptake rate.

The methods and systems of the present disclosure, as described above and shown in the drawings, provide for discharge systems having superior properties including the ability to maximize uptake rate for a gas into a liquid solvent to form an effluent discharge solution, while still reducing and/or preventing bubbles in the effluent discharge. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A discharge system, comprising:
a mixing vessel;
a feedstock tank having a pressure sensor configured to obtain a pressure measurement of a source feedstock in the feedstock tank;
a feedstock input line defining a feedstock flow path in fluid communication with the mixing vessel;
a solvent input line in fluid communication with the mixing vessel, wherein the solvent input line includes a solvent temperature sensor operatively connected thereto and a solvent pressure sensor operatively connected thereto;
a discharge output in fluid communication with an outlet of the mixing vessel; and
a feedstock valve on the feedstock input line to control the flow of a feedstock being fed into the mixing vessel to dissolve within a solvent thereby generating an effluent discharge solution having a known gas solubility saturation.

2. The discharge system of claim 1, comprising:
a controller configured to be operatively connected to the feedstock valve, wherein the controller includes a processor operatively connected to a memory, wherein the memory includes instructions recorded thereon that, when read by the processor, cause the processor to:
obtain temperature and pressure measurements of a solvent, and obtain a pressure measurement of a source feedstock in the feedstock tank;
correlate the temperature and pressure measurements of the solvent and the pressure measurement of the source feedstock to baseline data to generate a theoretical uptake rate for the source feedstock into the solvent and a theoretical flow rate of the source feedstock into the mixing vessel;
determine a required opening setting for a feedstock valve in the feedstock input line as a function of a flow rate of the feedstock in order to achieve a desired liquid displacement in the mixing vessel due to the feedstock being fed into the mixing vessel;
determine an uptake duration, based on the theoretical uptake rate, for the source feedstock to uptake into the solvent forming an effluent discharge solution and achieve an uptake displacement equivalent to the reverse of the desired liquid displacement; and
generate a valve operating control law for how the feedstock valve should function in a cycle based on the required opening setting of the feedstock valve and the uptake duration for the desired liquid displacement.

3. The discharge system of claim 1, a differential pressure (dP) sensor operatively connected between the feedstock input line and the discharge output to measure the differential pressure between the feedstock input line and the discharge output and operatively connected to a controller to provide the change in pressure data thereto.

4. The discharge system of claim 1, wherein the mixing vessel includes a nozzle proximate to a first side of the mixing vessel, wherein the solvent input line is operatively connected to the nozzle to direct the solvent toward a gas pocket generated by the gas entering with the feedstock through the feedstock input line.

5. A discharge system, comprising:
a mixing vessel including a nozzle proximate to a first side of the mixing vessel;

a feedstock input line defining a feedstock flow path in fluid communication with the mixing vessel;
a solvent input line in fluid communication with the mixing vessel;
a discharge output in fluid communication with an outlet of the mixing vessel; and
a feedstock valve on the feedstock input line to control the flow of a feedstock being fed into the mixing vessel to dissolve within a solvent thereby generating an effluent discharge solution having a known gas solubility saturation, wherein the solvent input line is operatively connected to the nozzle to direct the solvent toward a gas pocket generated by the gas entering with the feedstock through the feedstock input line, wherein the solvent input line is split into two lines, wherein a first of the two lines defines a flow path to the mixing vessel through the nozzle, and wherein a second of the two lines defines a flow path to the mixing vessel through an inlet on a second side of the mixing vessel.

* * * * *